(12) United States Patent
Buer

(10) Patent No.: US 8,713,309 B2
(45) Date of Patent: Apr. 29, 2014

(54) SYSTEM AND METHOD FOR DISTRIBUTED SECURITY

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1314 days.

(21) Appl. No.: 11/873,220

(22) Filed: Oct. 16, 2007

(65) Prior Publication Data
US 2008/0037793 A1  Feb. 14, 2008

Related U.S. Application Data

(62) Division of application No. 10/452,221, filed on Jun. 3, 2003, now Pat. No. 7,289,632.

(51) Int. Cl.
*G06F 21/00* (2013.01)

(52) U.S. Cl.
USPC .............. 713/157; 726/26; 726/27; 705/67; 709/206; 709/237; 380/277; 713/156; 713/168

(58) Field of Classification Search
USPC ........................................................ 713/157
See application file for complete search history.

(56) References Cited

U.S. PATENT DOCUMENTS

| | | | |
|---|---|---|---|
| 6,308,266 B1 | 10/2001 | Freeman | |
| 6,317,849 B1 | 11/2001 | Patel | |
| 6,484,262 B1 | 11/2002 | Herzi | |
| 6,496,858 B1 * | 12/2002 | Frailong et al. | 709/221 |
| 6,577,734 B1 | 6/2003 | Etzel et al. | |
| 6,587,945 B1 * | 7/2003 | Pasieka | 713/176 |
| 6,675,153 B1 * | 1/2004 | Cook et al. | 705/74 |
| 6,760,752 B1 * | 7/2004 | Liu et al. | 709/206 |
| 6,810,479 B1 * | 10/2004 | Barlow et al. | 713/185 |
| 6,971,017 B2 * | 11/2005 | Stringer et al. | 713/182 |

(Continued)

FOREIGN PATENT DOCUMENTS

WO    WO 02/052784 A1    7/2002

OTHER PUBLICATIONS

SPINS: Security Protocols for Sensor Networks|http://www.csee.umbc.edu/courses/graduate/CMSC691A/Spring04/papers/spins-wine-journal.pdf|PERRIG et al.|2002|pp. 531-534.*

(Continued)

*Primary Examiner* — Mahfuzur Rahman
(74) *Attorney, Agent, or Firm* — Sterne, Kessler, Goldstein & Fox PLLC

(57) ABSTRACT

A security architecture in which a security module is integrated in a client machine, wherein the client machine includes a local host that is untrusted. The security module performs encryption and decryption algorithms, authentication, and public key processing. The security module also includes separate key caches for key encryption keys and application keys. A security module can also interface a cryptographic accelerator through an application key cache. The security module can authorize a public key and an associated key server. That public key can subsequently be used to authorize additional key servers. Any of the authorized key servers can use their public keys to authorize the public keys of additional key servers. Secure authenticated communications can then transpire between the client and any of these key servers. Such a connection is created by a secure handshake process that takes place between the client and the key server. A time value can be sent from the key server to the client, allowing for secure revocation of keys. In addition, secure configuration messages can be sent to the security module.

20 Claims, 12 Drawing Sheets

(56) References Cited

U.S. PATENT DOCUMENTS

| | | | |
|---|---|---|---|
| 6,981,138 B2 | 12/2005 | Douceur et al. | |
| 6,981,156 B1 | 12/2005 | Stern et al. | |
| 7,068,789 B2* | 6/2006 | Huitema et al. | 380/277 |
| 7,200,868 B2* | 4/2007 | Mattox et al. | 726/26 |
| 7,277,953 B2* | 10/2007 | Wils et al. | 709/229 |
| 7,289,632 B2 | 10/2007 | Buer | |
| 7,383,433 B2* | 6/2008 | Yeager et al. | 713/157 |
| 7,415,620 B2* | 8/2008 | England et al. | 713/193 |
| 7,536,544 B2* | 5/2009 | Xiao | 713/158 |
| 7,822,989 B2* | 10/2010 | Libin et al. | 713/182 |
| 2002/0087858 A1* | 7/2002 | Oliver et al. | 713/156 |
| 2002/0104006 A1 | 8/2002 | Boate et al. | |
| 2003/0041110 A1* | 2/2003 | Wenocur et al. | 709/206 |
| 2003/0070070 A1* | 4/2003 | Yeager et al. | 713/157 |
| 2004/0005061 A1* | 1/2004 | Buer et al. | 380/282 |
| 2004/0158708 A1* | 8/2004 | Peyravian et al. | 713/156 |
| 2004/0210756 A1* | 10/2004 | Mowers et al. | 713/168 |
| 2005/0114666 A1* | 5/2005 | Sudia | 713/175 |
| 2009/0222574 A1* | 9/2009 | Xiao | 709/237 |

OTHER PUBLICATIONS

Search Report from European Patent Application No. 04012917.3, dated Feb. 20, 2012, 4 pages.

"3$^{rd}$ Generation Partnership Project; Technical Specification Group Services and System Aspects; 3G Security; Security architecture (Release 5)", 3GPP Standard; 3GPP TS 33.102, No. V5.1.0, Dec. 2002, 61 pages.

Partial European Search Report directed toward related EP Application No. 13 00 3009, dated Aug. 20, 2013, European Patent Office, Munich, Germany; 4 pages.

"Building an E-Commerce Trust Infrastructure SSL Server Certificates and Online Payment Services," *VeriSign Technical Brief*, pp. i/ii, 1-37 (Nov. 2000).

Freier, A., et al., "The SSL Protocol Version 3.0," *Netscape Communications*, Transport Layer Security Working Group, pp. 1-64 (Nov. 18, 1996).

Thomas, S.A., et al., "SSL Operation," in *SSL & TLS Essentials, Securing the Web*, pp. 37-65, Wiley Computer Publishing, John Wiley & Sons, Inc. (2000).

* cited by examiner

SYSTEM AND METHOD FOR DISTRIBUTED SECURITY

CROSS-REFERENCE TO RELATED APPLICATIONS

This application is a divisional of application Ser. No. 10/452,221, filed Jun. 3, 2003 now U.S. Pat. No. 7,289,632, which is incorporated by reference herein in its entirety.

BACKGROUND OF THE INVENTION

1. Field of the Invention

The invention described herein relates to information processing and to the security of network information systems in particular.

2. Related Art

One of the problems common to information security systems is minimization of a security boundary. A security boundary can be viewed as a conceptual demarcation of information and logic that must not be compromised. Logic within the security boundary performs security-related actions, such as encryption, decryption, authentication, and any other processes that require the handling of sensitive information. Preferably, such a boundary is minimized. This allows a designer to treat much of the surrounding system as untrusted. A complementary design goal is to avoid overloading trusted processing assets. Preferably, as much processing as possible should be left to untrusted logic. This permits the trusted logic to concentrate on security related operations. Moreover, such processes can be computationally intensive, e.g., the mathematical processing associated with public key cryptography. Finally, while a security boundary must be well defined, it is also desirable to define this boundary in a flexible manner. This allows a designer to add logic to the portion of a design that is inside a security boundary. This increases the designer's options, and allows the addition or deletion of sensitive logic after a system is fielded.

What is needed, therefore, is a security architecture that provides for a minimal security boundary and allows as much processing as possible to be performed outside the boundary. This would allow for secure, authenticated transmission of both traffic and cryptographic keys using minimal logic. Moreover, such a system would allow the easy and secure configuration or reconfiguration of logic within the security boundary.

SUMMARY OF THE INVENTION

The invention described herein is a security architecture in which a security module is integrated in a client machine, wherein the client machine includes a local host that is untrusted. In an embodiment of the invention, the security module is implemented in hardware, and includes logic for performing one or more cryptographic operations such as encryption, decryption, and public key processing. In an embodiment of the invention, the security module also includes separate key caches for key encryption keys (KEKs) and for application keys. A security module can also interface additional logic external to the module, where the external logic performs arithmetic operations offloaded by the security module for purposes of speeding up cryptographic processing. Such external logic is referred to as a cryptographic accelerator.

In the invention described herein, the security module is preprogrammed with the authorization data for a key server. If this authorization data matches authorization data that is calculated based on the public key of a prospective authorized key server, then that key server and its public key are viewed as being authorized. That public key can subsequently be used to authorize additional entities, such as additional key servers. Further, any of the authorized key servers can use their public keys to authorize the public keys of additional key servers. In this manner, a list can be constructed of authorized public keys that correspond to respective authorized key servers.

Secure authenticated communications can then transpire between the client and any of these authorized key servers. Such a connection is created by a secure handshake process that takes place between the client and an authorized key server.

Given one or more authorized key servers and a secure, authenticated connection between the key server and the client, a number of operational features are now feasible. Cryptographic keys can now be passed from the key server to the security module. Moreover, a time value can also be sent from the key server to the client, such that a countdown timer at the security module is programmed with this time value. Any key associated with the time value can only be used until the timer decrements to zero. This allows for secure revocation of keys. In addition, secure configuration messages can be sent to the security module, allowing configuration or reconfiguration of logic within the module. Any such configuration message is sent to the security module accompanied by a signature that is created using one of the above mentioned authorized public keys. This allows for authenticated, secure control of a module's configuration. Moreover, such reconfiguration can be performed even after a system is fielded. In addition, the presence of a distinct application key cache in the security module allows for an interface to logic external to the module, such as a cryptographic accelerator. This allows for straightforward inclusion of such an accelerator into the security boundary. Moreover, security functionality is enhanced without modification to the security module itself.

BRIEF DESCRIPTION OF THE FIGURES

The present invention will be described with reference to the accompanying drawings. In the drawings, like reference numbers generally indicate identical, functionally similar, and/or structurally similar elements. The drawing in which an element first appears is indicated by the left most digit in the reference number.

DETAILED DESCRIPTION OF THE PREFERRED EMBODIMENTS

Figure 1:
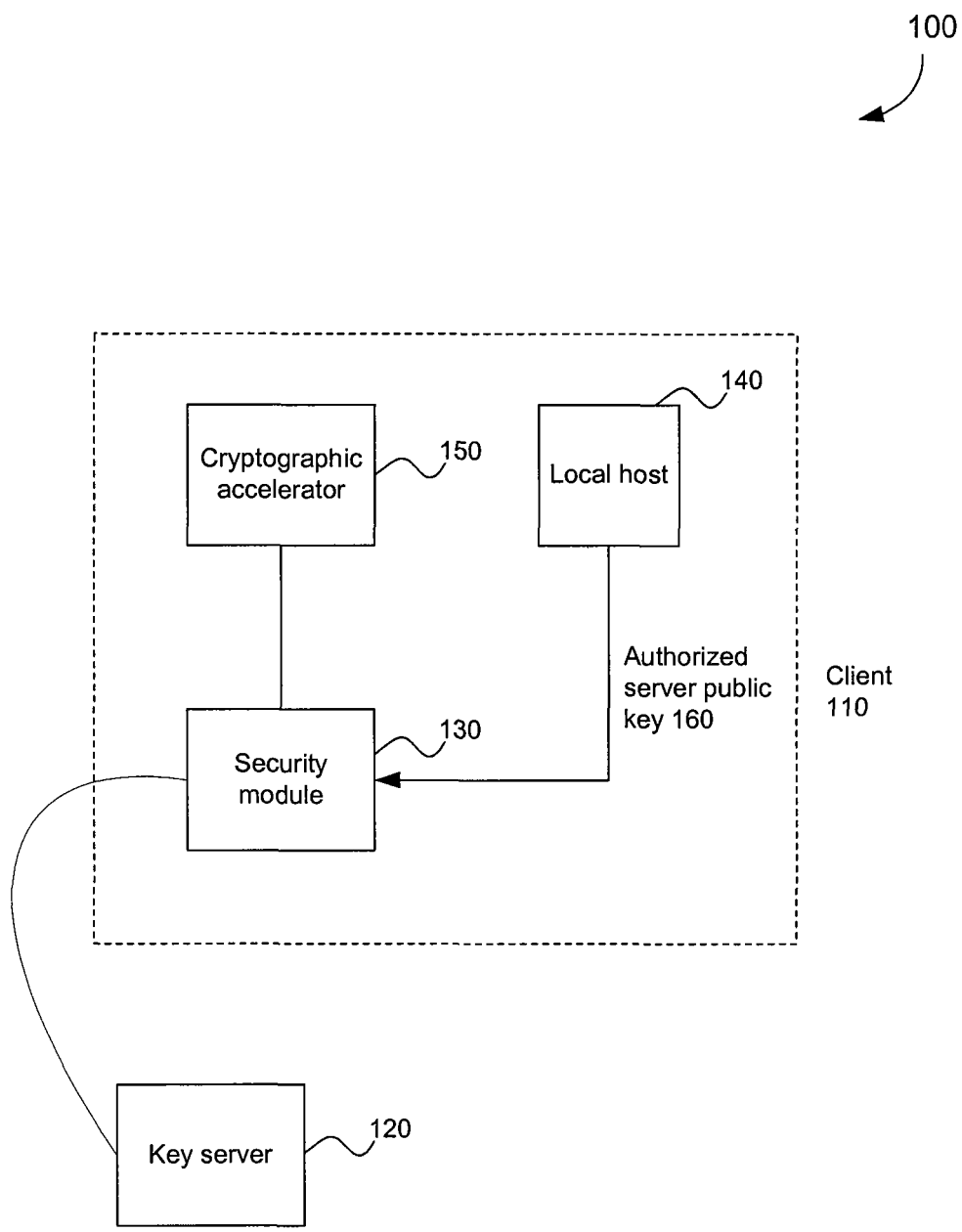
FIG. 1 is a block diagram illustrating an embodiment of the invention in which an authorized server public key is transferred to a security module for purposes of verifying the authorization of a key server.

A preferred embodiment of the present invention is now described. While specific configurations and arrangements are discussed, it should be understood that this is done for illustrative purposes only. A person skilled in the relevant art will recognize that other configurations and arrangements can be used without departing from the spirit and scope of the invention. It would be apparent to a person skilled in the relevant art that this invention can also be employed in a variety of other systems, networks, and applications.

I. Overview

The invention described herein is a security architecture in which a security module is integrated in a client machine, wherein the client machine includes a local host that is untrusted. In an embodiment of the invention, the security module is implemented in hardware, and includes logic for performing one or more cryptographic operations such as encryption and decryption (e.g., the Advanced Encryption Standard (AES) or the triple Data Encryption Standard (3DES)), authentication (e.g., the Secure Hashing Algorithm (SHA1)) and public key processing (e.g., the Rivest Shamir Adleman (RSA) or Diffie-Hellman algorithms). In an embodiment of the invention, the security module also includes separate key caches for key encryption keys (KEKs) and for application keys. A security module can also interface additional logic external to the module, logic that performs arithmetic operations offloaded by the security module for purposes of speeding up cryptographic processing. Such external logic is referred to as a cryptographic accelerator.

In the invention described herein, the security module is preprogrammed with the authorization data for a key server. If this authorization data matches authorization data that is calculated based on the public key of a prospective authorized key server, then that key server and its public key are viewed as being authorized. That public key can subsequently be used to authorize additional entities, such as additional key servers. Further, any of the authorized key servers can use their public keys to authorize the public keys of additional key servers. In this manner, a list can be constructed of authorized public keys that correspond to authorized key servers. Secure authenticated communications can then transpire between the client and any of these authorized key servers. Such a connection is created by a secure handshake process that takes place between the client and the authorized key server.

Given one or more authorized key servers and a secure, authenticated connection between the key server and the client, a number of operational features are now feasible. Cryptographic keys can now be passed from the key server to the security module. Moreover, a time value can also be sent from the key server to the client, such that a countdown timer is programmed with this time value. Any key associated with the time value can only be used until the timer decrements to zero. This allows for secure revocation of keys. In addition, secure configuration messages can be sent to the security module, allowing configuration or reconfiguration of logic within the module. Any such configuration message is sent to the security module accompanied by a signature that is created using one of the above mentioned authorized public keys. This allows for authenticated, secure control of a module's configuration. Moreover, such reconfiguration can be performed even after a system is fielded. In addition, the presence of a distinct application key cache in the security module allows for an interface to logic that is external to the module, such as a cryptographic accelerator. This permits straightforward inclusion of such an accelerator into the security boundary. Moreover, the functionality of the security module is enhanced without modification to the security module itself.

II. System

The system of the invention is illustrated generally in FIG. 1. A client 110 is shown in communication with a key server 120. Internal to client 110 is security module 130, local host 140, and a cryptographic accelerator 150 in communication with security module 130. Security module 130 is preprogrammed to contain server authorization data associated with a particular key server and the server's public key. In an embodiment of the invention, the server authorization data is a secure hash value based on the public key of the key server. The hashing process used to create the server authorization data can, for example, be the SHA1 process. Local host 140 is shown transferring an authorized server public key 160 to a security module 130. Security module 130 then calculates the secure hash value based on the authorized server public key 160. If the resulting value matches the pre-stored server authorization data, then the authorization of the associated key server is verified. If key server 120 is the key server associated with public key 160, then key server 120 is trusted by client 120 and a secure connection between client 110 and key server 120 can now be created.

Because security module 130 is now aware of a validated public key, i.e., authorized server public key 160, additional entities can now be authorized. Public key 160, for example, can now be used to sign the public key of another entity, such as another key server. Hence, another key server and its public key are now recognized as authorized. Either of the now authorized public keys can then be used to sign yet another pubic key associated with yet another key server. In this way, a chain can be built consisting of authorized key servers and their public keys. Authorized server public key 160 can therefore be thought of as a root value for this chain. The process of verifying public keys will be described in greater detail below.

Figure 2:
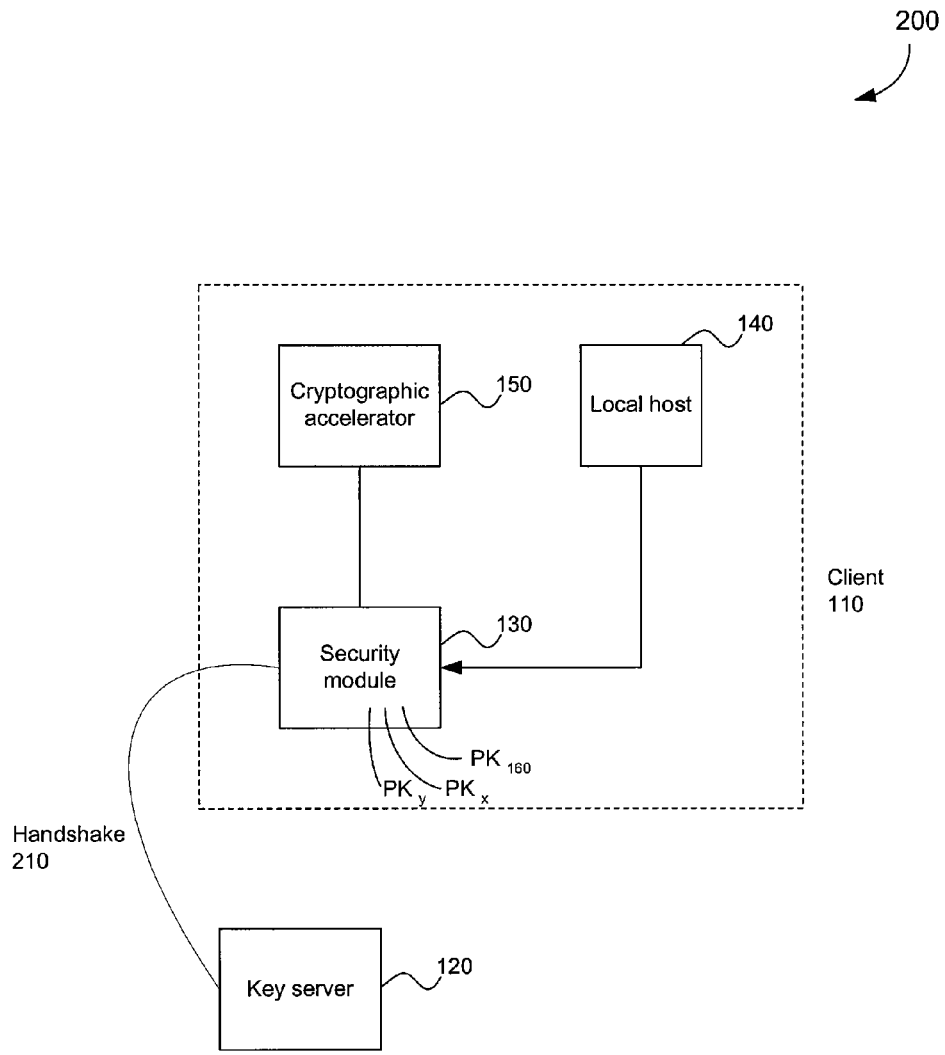
FIG. 2 is a block diagram of an embodiment of the invention in which a secure handshake takes place between a key server and a client.

FIG. 2 illustrates generally the handshake process that transpires between security module 130 and key server 120. This allows secure communications to take place between security module 130 and key server 120. As will be described in greater detail below, the handshake 210 serves to implement a transport layer security (TLS) protocol. Note that at this point, one or more server public keys have been authorized. These are shown as authorized server public key $PK_{160}$, $PK_X$, and $PK_Y$.

Figure 3:
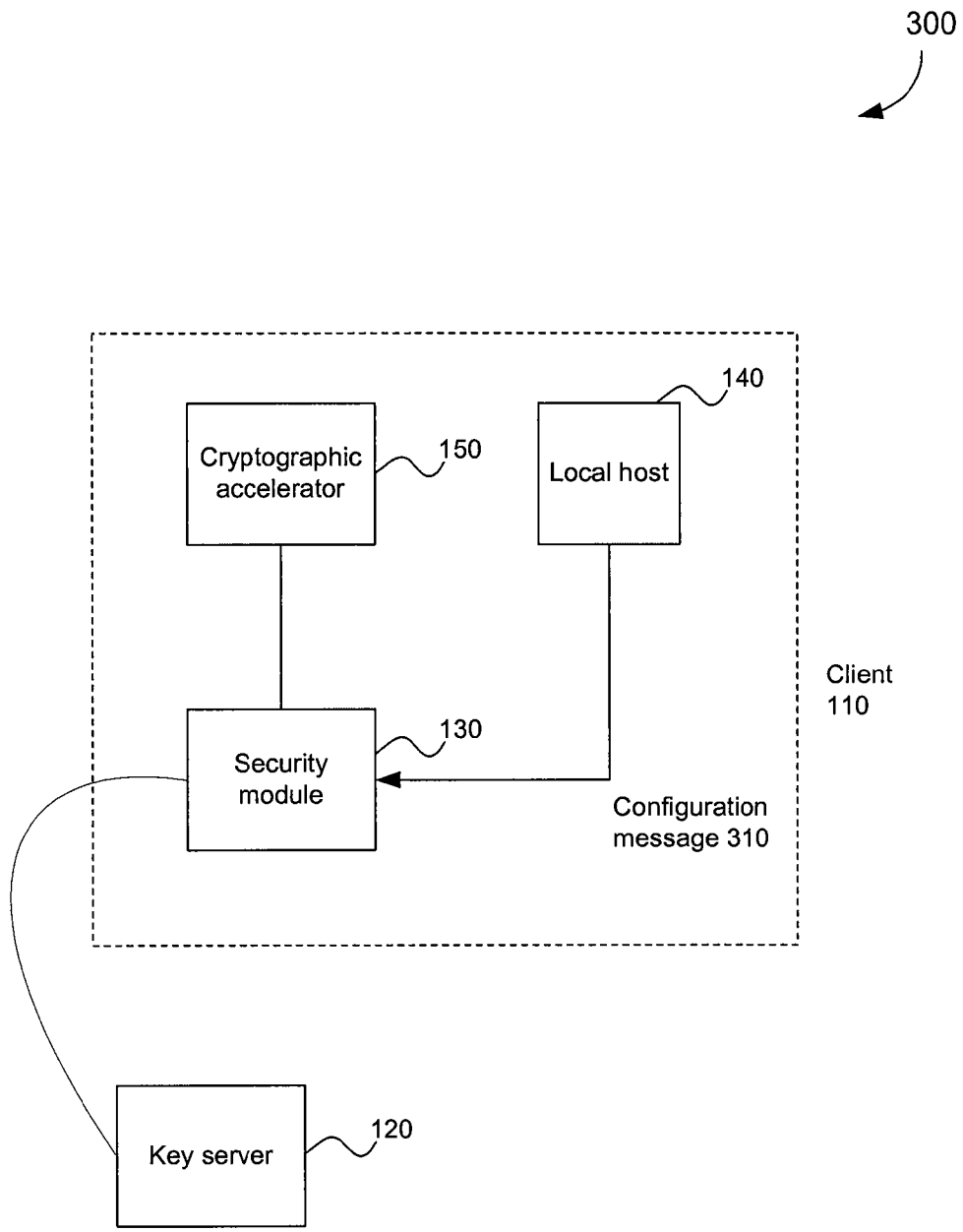
FIG. 3 is a block diagram illustrating the transfer of a configuration message from a local host to a security module in a client, according to an embodiment of the invention.

Given that one or more authorized server public keys are now available to the client 110, there are a number of ways in which such keys can be used. For example, as shown in FIG. 3, a configuration message 310 can now be transferred to security module 130 in a secure manner. Local host 140 may, for example, hold persistent data that must be transferred to security module 130 in the form of a message 310. Since local host 140 is not trusted, however, a mechanism is required by which this transfer can take place in a secure manner. In an embodiment of the invention, an authorized signature accompanies any data transferred to the security module 130 from local host 140. The persistent data is stored at local host 140 in encrypted form, along with the authorized signature. The authorized signature will have been created using one of the authorized server public keys described above. The security module will not load any persistent data unless the signature accompanies the data. Such a mechanism prevents spoofing of security module 130.

In addition, a key can be viewed as persistent data. It may be necessary, for example, to transfer a key to security module 130 in a secure manner. In such a situation, a time value is also transferred to security module 130. The time value can be used to set a countdown timer in security module 130, in accordance with a system security policy. Any key that is associated with the time value is rendered unusable once the countdown timer reaches zero. This mechanism therefore serves as a way in which key expiration can be enforced. As will be described in greater detail below, any subsequently received time value serves to render unusable any preexisting keys that had been associated with a previously sent time value. In one embodiment of the invention, one tick of the countdown timer corresponds to one second. In addition, in an embodiment of the invention, the time value includes a sequence number so the previously transmitted time values cannot be captured by an adversary and replayed to the security module 130.

Configuration message 310 can also be used to configure the logic of security module 130. It may be desirable, for example, to reconfigure security module 130 so as to impose some minimum or maximum key length. Given the above mechanism, such a reconfiguration can be implemented using a configuration message 310. This represents a secure method by which a reconfiguration can be implemented while the system is in the field. Such a configuration process would be useful in situations where it is desirable to build and field a security module 130 but configure it differently depending on whether the security module is to be exported. For some markets, for example, one key length would be permitted; in another market, a different key length would be allowed. This could be implemented using an "in field" upgrade as described above.

Configuration message 310 can also be used to constrain the ways in which a given key can be used, as a way of enforcing a system security policy. If a key is to be used strictly for signing, for example, or for both signing and encryption, such constraints can be conveyed to security module 130 through configuration message 310. Alternatively, a given key may be constrained to be used only with regard to certain other entities, e.g., only to secure communications with a server.

Figure 4:
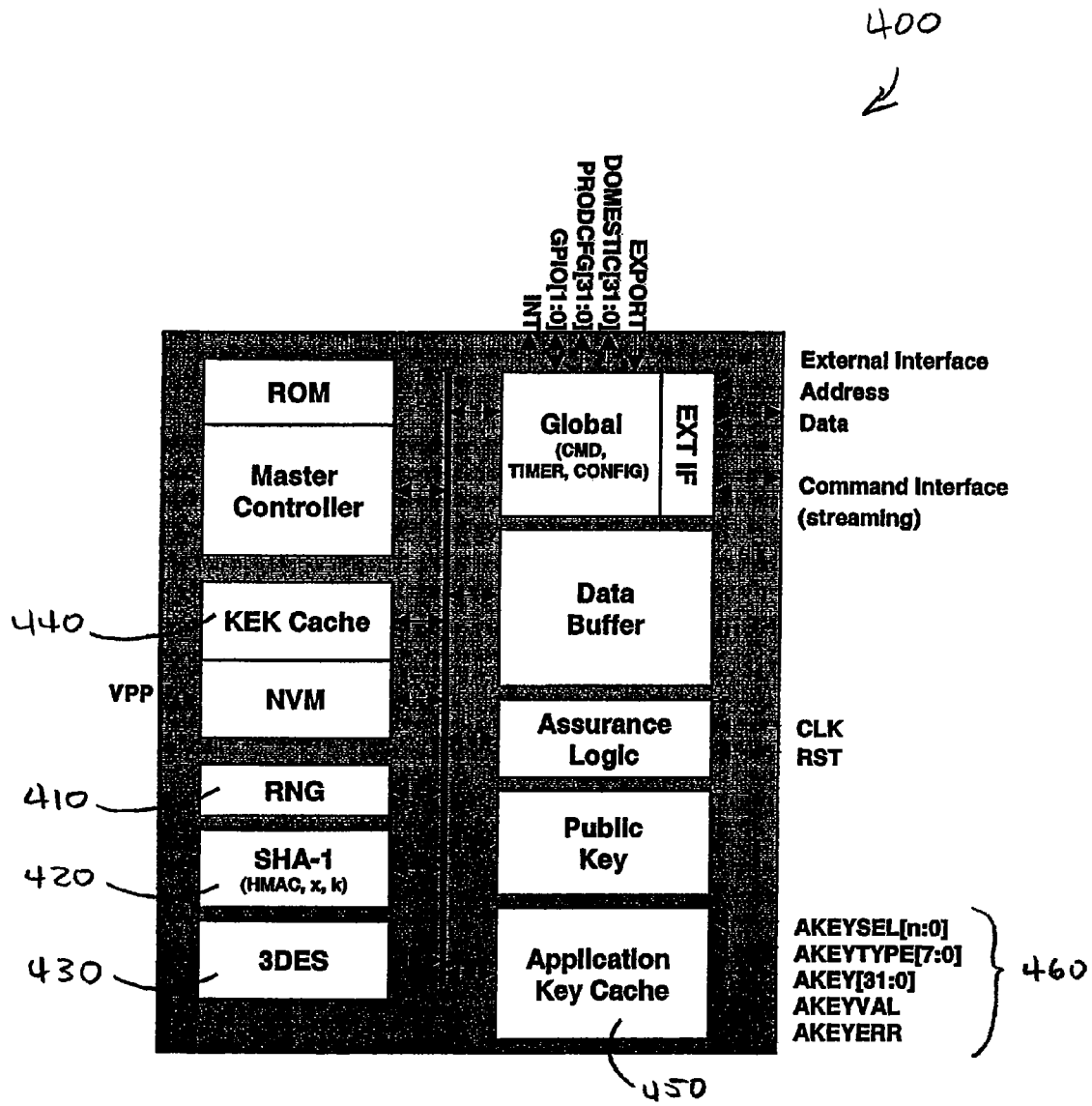
FIG. 4 is a block diagram illustrating the functional components of a security module, according to an embodiment of the invention.

FIG. 4 illustrates a more detailed block diagram of security module 130. In addition to logic for a variety of cryptographic processes, such as random number generation (RNG) (block 410), SHA1(block 420), and 3DES (block 430), security module 130 also includes key caches. Security module 130 includes a KEK cache 440, and a separate application key cache 450. The application key cache includes an interface 460 to which additional processing logic can be connected. In an embodiment of the invention, for example, a cryptographic accelerator (not shown in FIG. 4) can be connected to security module 130 at this point. If this is the case, the security boundary effectively includes the cryptographic accelerator as well as the security module 130. This represents an architecture in which additional cryptographic logic can be added without having to modify the logic already existing in security module 130.

III. Method

In general, the invention described herein establishes a secure authenticated connection between a key server and the client. Once a key server is recognized as authorized, a secure handshake can take place to enable a secure session in which keys or other information can be transferred between the key server and the client. The authorization of a key server and its public key allows a number of other operations to take place securely, such as the transfer of configuration messages.

Figure 5:
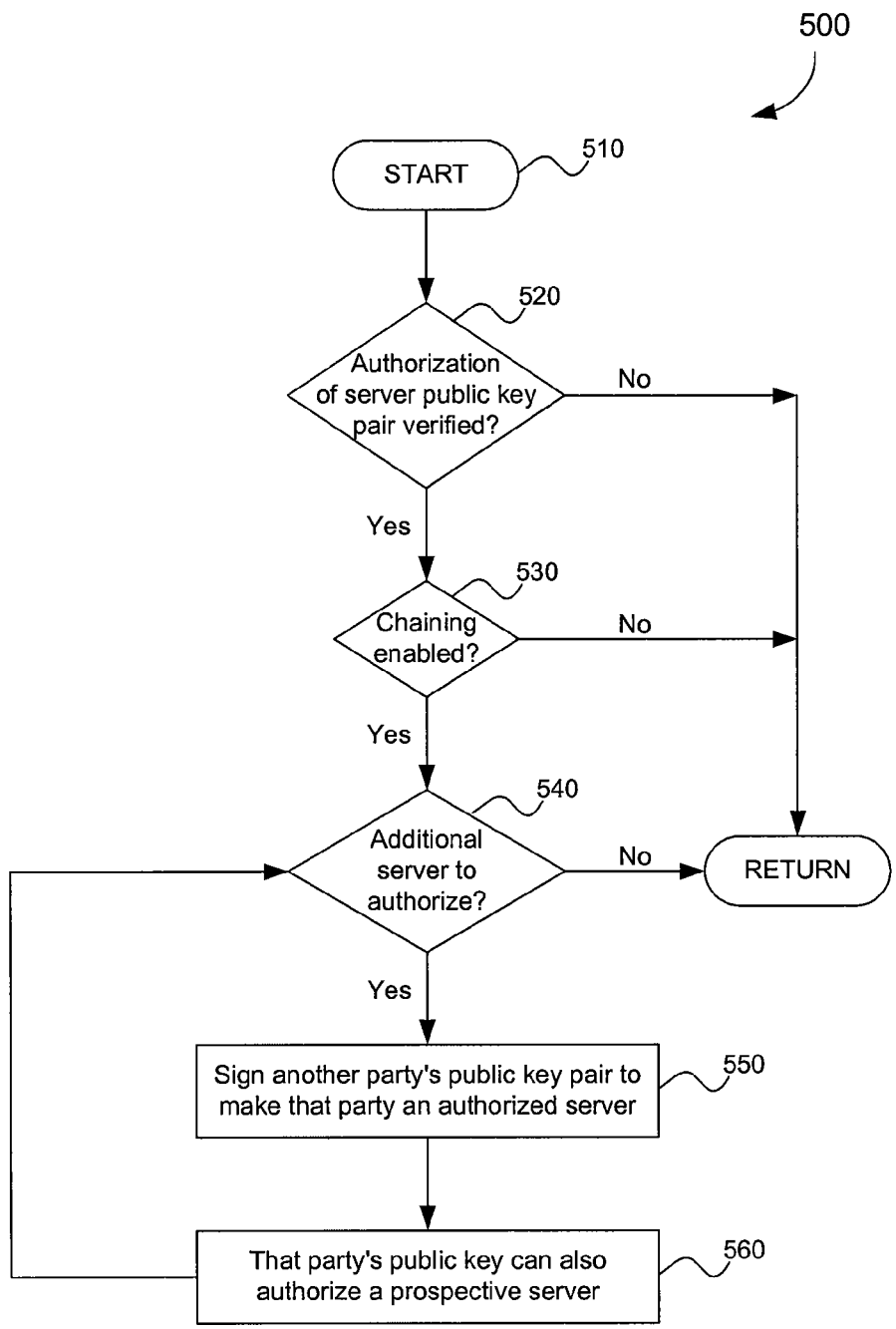
FIG. 5 is a flowchart illustrating the process of authorizing one or more key servers, according to an embodiment of the invention.

FIG. 5 illustrates the process by which one or more key servers and their respective public keys are recognized as authorized. The process begins at step 510. In step 520, a determination is made as to whether the authorization of a server public key has been verified. If so, a determination is made in step 530 as to whether chaining has been enabled. In this embodiment of the invention, a flag in the security module can be set or reset to indicate that the verified public key of step 520 can be used to authorize additional key servers and their public keys. If chaining is enabled in step 530, then a determination is made in step 540 as to whether there is an additional server to authorize. If so, then the process proceeds to step 550. Here, a verified server public key is used to sign the public key pair of another party to recognize that party as an authorized server. In step 560, that party's public key is added to the list of authorized server public keys. Hence this latest public key can also authorize a perspective additional key server. The process then returns to step 540 in which a determination is made as to whether there is an additional server to authorize. In this way, a chain of authorized servers can be created and a list of their respective public keys maintained.

Figure 6:
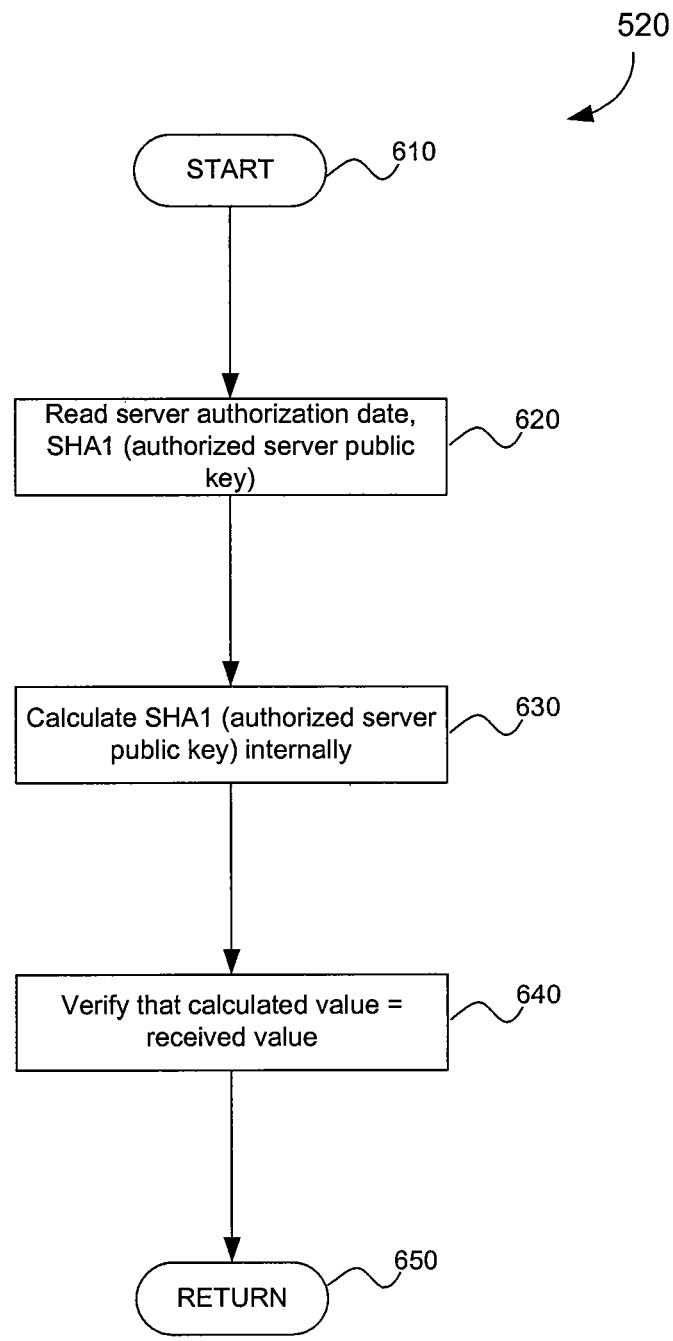
FIG. 6 is a flowchart illustrating the process of verifying the authorization of an initial, or root, key server according to an embodiment of the invention.

Step 520, the step of verifying the authorization of a server public key, is illustrated in greater detail in FIG. 6. The process begins at step 610. In step 620, the security module reads its preprogrammed server authorization data. The server authorization data is the hash value that is based on an authorized server public key. In the illustrated embodiment, the hash process is the SHA1 operation. In step 630, the security module calculates the SHA1 value based on the authorized server public key that is received from the local host. In step 640, the calculated value is compared to the received value. A match implies that the server public key is in fact authorized.

Figure 7:
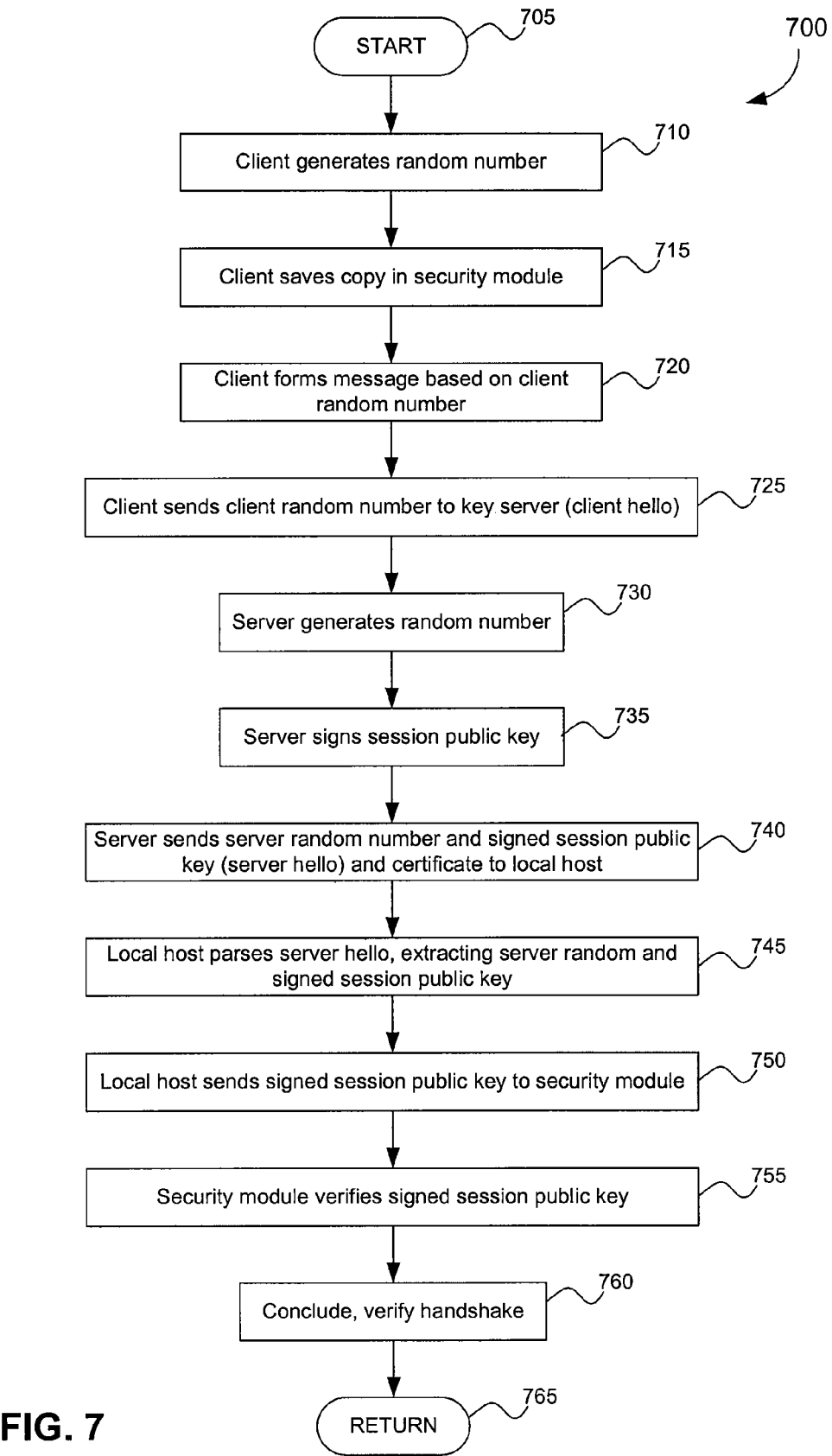
FIG. 7 is a flowchart illustrating the secure handshake process between a client and a key server, according to an embodiment of the invention.

FIG. 7 illustrates the process of the secure handshake that takes place between a client and a key server. This handshake serves to initiate the transport layer security (TLS) protocol. The process begins at step 705. In step 710, the client generates a random number at the security module. In step 715, a copy of the random number is saved. In step 720, a message is formed based on this client random number. In step 725, the client sends this client random number to the key server. This transmission is sometimes referred to as the client hello.

In step 730, the server generates its own random number. In step 735, the server signs a session public key. In step 740, the server sends its server random number and the signed session public key (sometimes known as the server hello) and a certificate to the local host of the client. In step 745, the local host parses the server hello, and extracts the server random number and the signed session public key. In step 750, the local host sends the signed session public key to the security module. In step 755, the security module verifies the signed session public key. In step 760, the handshake concludes with a verification process that is based on all the preceding communications between the client and the key server. Steps 755 and 760 are described in more detail below. The process concludes at step 765.

Figure 8:
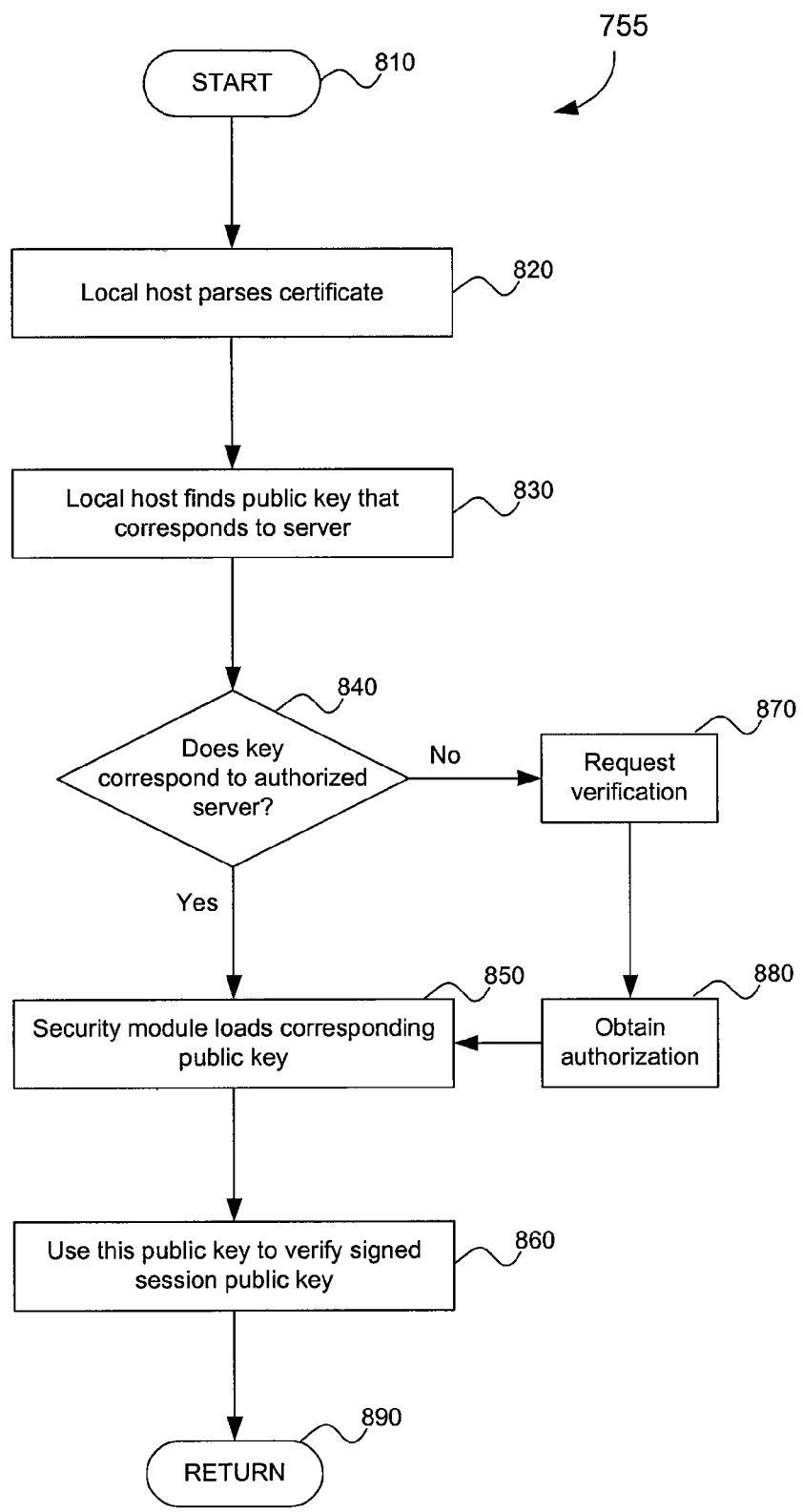
FIG. 8 is a flowchart illustrating the process of verifying a signed session public key, according to an embodiment of the invention.

Step 755 above, the step of verifying the signed session public key, is illustrated in greater detail in FIG. 8. The process begins at step 810. In step 820, the local host parses the certificate. In step 830, the local host finds the public key that corresponds to the server. In step 840, a determination is made as to whether the key corresponds to the prospective authorized server. If not, verification can be requested from the server in step 870, and the authorization obtained in step 880. In step 850, the security module loads the corresponding public key. In step 860, this public key is used to verify the signed session public key. The process concludes at step 890.

Figure 9:
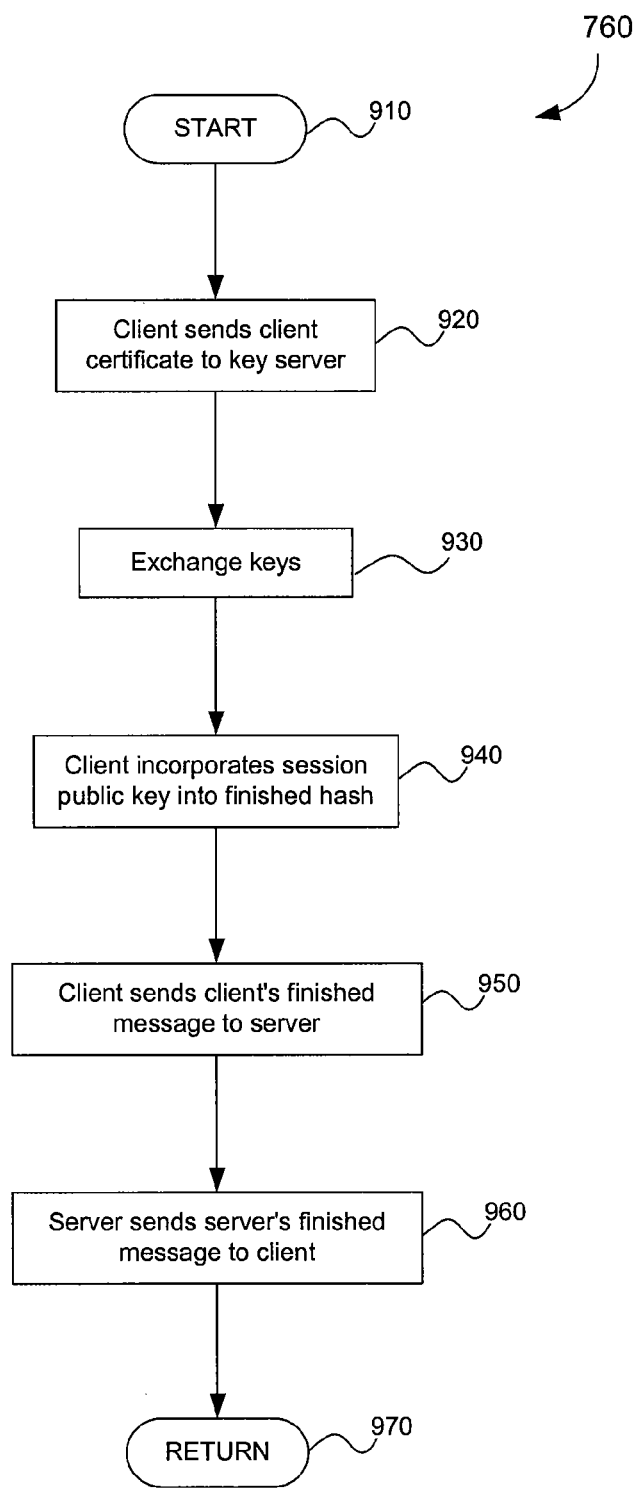
FIG. 9 is a flowchart illustrating the process of verifying a handshake, according to an embodiment of the invention.

Step 760 above, the step of verifying the handshake process, is illustrated in greater detail in FIG. 9. The process starts with step 910. In step 920, the client sends the client certificate to the key server. In step 930, the exchange of keys takes place. In step 940, the client incorporates the session public key into a finished hash value. In step 950, the client sends its finished message, including the above hash value, to the server. In step 960, the server sends its finished message to the client. The process concludes at step 970.

Note that the handshake process as illustrated in FIGS. 5 through 9 presumes the use of the Diffie Hellman public key process. In alternative embodiments of the invention, other public key processes can be used, such as the Rivest Shamir Adleman (RSA) process.

Figure 10:
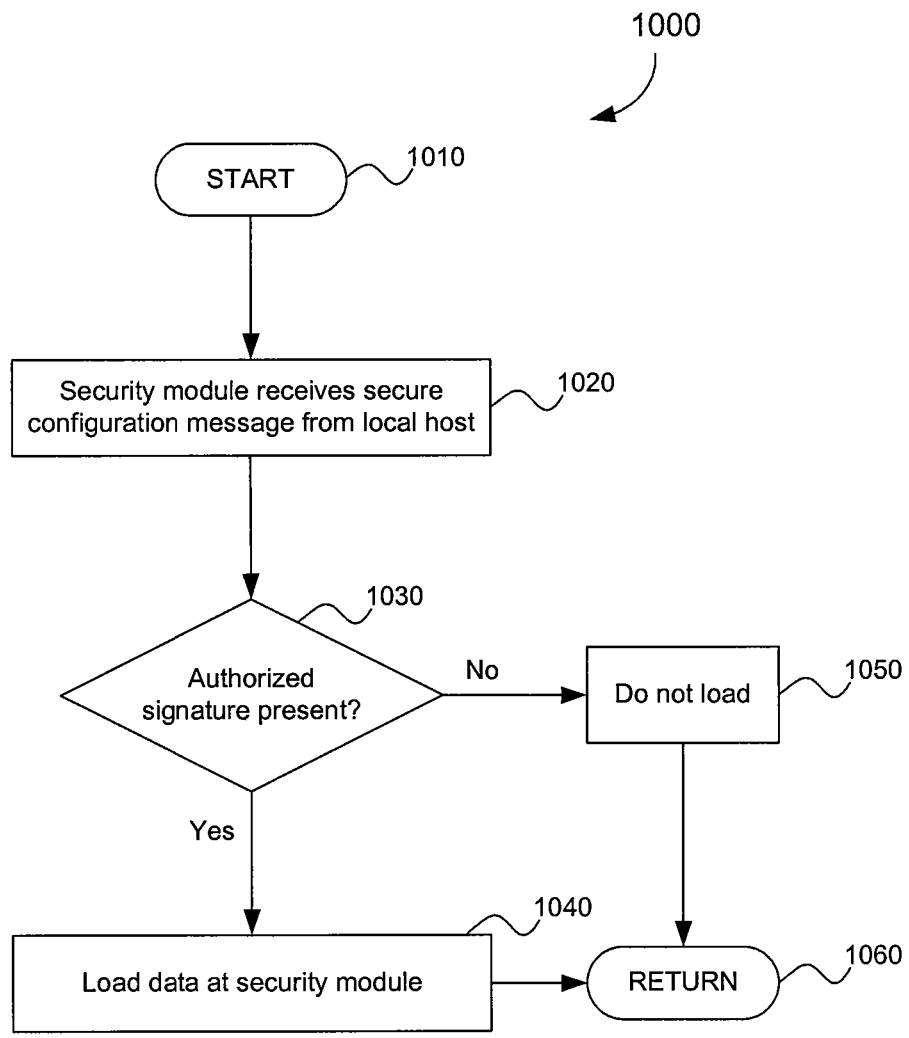
FIG. 10 is a flowchart illustrating the process of securely transferring a configuration message from a local host to a security module, according to an embodiment of the invention.

The process by which persistent data can now be transferred from the local host to the security module is illustrated in FIG. 10. The process begins at step 1010. In step 1020, the security module receives a secure configuration message from the local host. As described above, the configuration message is typically in encrypted form. In step 1030, a determination is made as to whether an authorized signature is present. If not, then the secure configuration message is not used, as shown in step 1050. If an authorized signature is present, then the configuration message is loaded at the security module. Note that the determination of step 1030 comprises the determination as to whether the signature is verified as that of one of the authorized public keys. The process concludes at step 1060.

Figure 11:
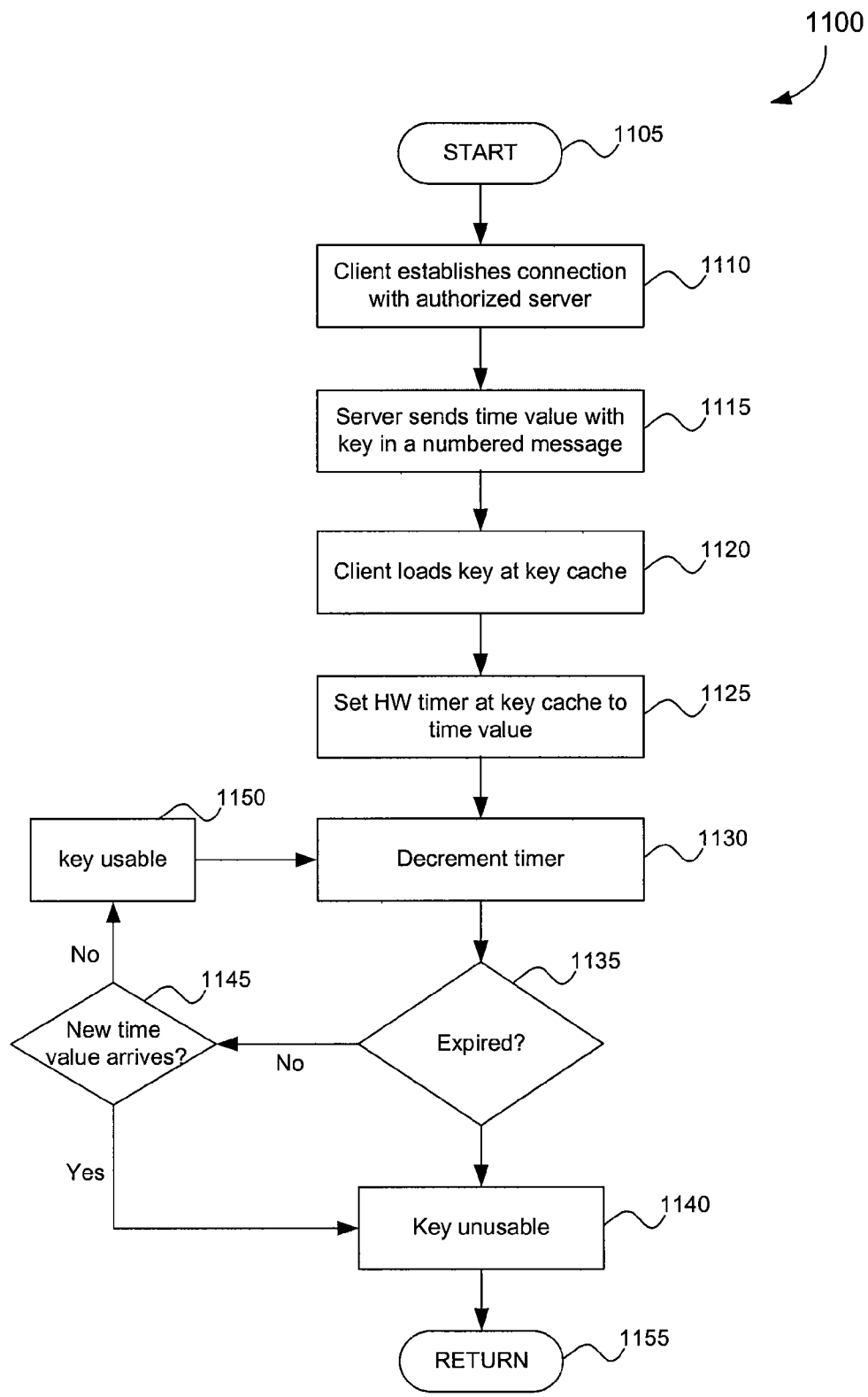
FIG. 11 is a flowchart illustrating the process of transferring a time value to a security module for purposes of setting a countdown timer in the security module, according to an embodiment of the invention.

FIG. 11 illustrates a process by which a key can be transferred as persistent data from a local host to the security module. The process begins at step 1105. In step 1110, the client establishes a secure connection with the authorized server. In step 1115, the key server sends a time value with a key in a numbered message to the client. In step 1120, the client loads the key at the key cache in the security module. In step 1125, a countdown timer is set at the key cache according to the received time value. Note that in an embodiment of the invention, the timer is implemented in hardware at the key cache. In step 1130, the timer is decremented. In step 1135 a determination is made as to whether the timer has reached zero, i.e., expired. If so, then in step 1140, the key is rendered unusable. If the timer has not yet expired, a determination is made as to whether a new time value has arrived. If so, again, the existing key is rendered unusable in step 1140. If no new time value has arrived, then the key is considered to be usable in step 1150. The process then returns to step 1130 where the timer is further decremented. Hence, a key is rendered unusable if the timer has expired or if a new time value has arrived. Hence, a new time value has the effect of flushing out any preexisting key that is associated with the previous time value. Also, as described above, the time value is sent in a numbered message in an embodiment of the invention. This prevents an adversary from copying a previous message and replaying it to a client.

Figure 12:
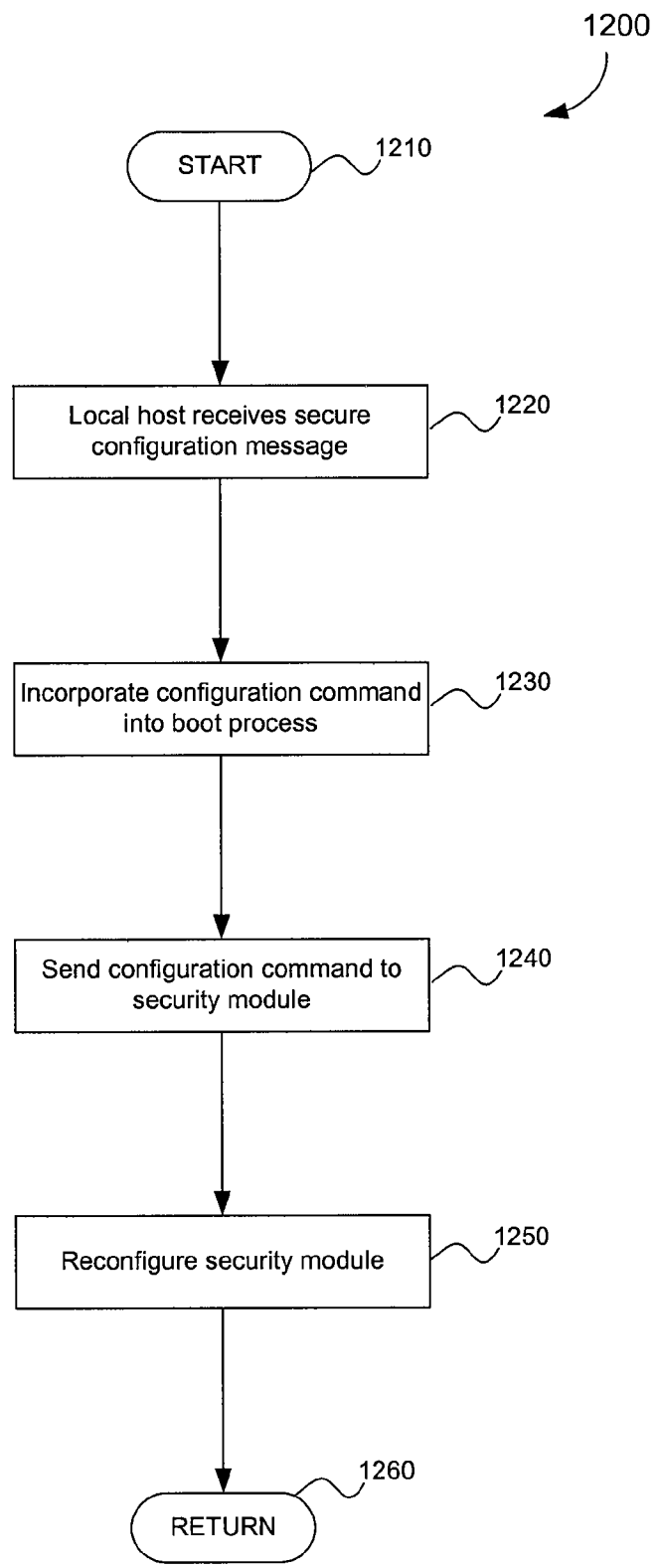
FIG. 12 is a flowchart illustrating the process of reconfiguring a security module according to a secure configuration message, according to an embodiment of the invention.

The process of configuring or reconfiguring the logic in the security module using a configuration message is illustrated in FIG. 12. The process begins at step 1210. In step 1220, the local host receives a secure configuration message. In step 1230, the configuration command is incorporated into the boot process. In step 1240, the configuration command is sent to the security module at the time of booting. In step 1250, the security module is reconfigured according to the command, provided that an accompanying signature is validated. The process concludes at step 1260.

IV. Conclusion

While various embodiments of the present invention have been described above it should be understood that they have been presented by way of example, and not limitation. It would be apparent to persons skilled in the relevant art that various changes in detail can be made therein without departing from the spirit and scope of the invention. Thus, the present invention should not be limited by any of the above described exemplary embodiments.

What is claimed is:

1. A method, at a client, for creating a hierarchy of key servers, wherein a key server is configured to distribute cryptographic keys to one or more network entities, the method comprising:
   determining that a first key server is authorized by comparing information stored in a security module of the client with a hash value of a first public key associated with the first key server, wherein the first public key is configured to expire after a predetermined period of time;
   accessing information in the security module to determine whether the first key server is permitted to authorize additional key servers; and
   in response to determining that the first key server is permitted to authorize additional key servers, signing a second public key of a second key server with the first public key to authorize the second key server, wherein either the first public key of the first key server or the second public key of the second key server can be used to authorize an additional key server.

2. The method of claim 1, wherein the hash value is a Secure Hash Algorithm 1 (SHA1) value.

3. The method of claim 1, further comprising:
   receiving, at the security module, a configuration message from a local host of the client;
   determining whether the configuration message is accompanied by a signature created by an authorized public key; and
   in response to determining that the configuration message is accompanied by the signature, loading content of the configuration message.

4. The method of claim 3, wherein the configuration message, when loaded, alters a functionality available to the security module.

5. The method of claim 4, wherein the configuration message, when loaded, enables a cryptographic accelerator.

6. The method of claim 4, wherein the configuration message, when loaded, places a constraint on key length.

7. The method of claim 4, wherein the configuration message, when loaded, removes a constraint on key length.

8. The method of claim 4, wherein the configuration message, when loaded, constrains how a given key is to be used, in accordance with a system security policy.

9. The method of claim 4, wherein the configuration message, when loaded, constrains the time interval over which a given key is usable, in accordance with a system security policy.

10. The method of claim 1, wherein the first public key is configured to expire after a countdown timer reaches zero.

11. A method of establishing an authenticated connection between a client and a key server through a handshake process, the method comprising:
   generating a client random number;
   saving a copy of the client random number in a security module of the client;
   sending the client random number to the key server;
   receiving a server random number, a signed session key, and a certificate from the key server;
   sending the signed session key to the security module;
   verifying the signed session key by determining whether the signed session key has been signed with a verified public key; and
   verifying the handshake process by comparing a hash of a first public key corresponding to the key server with information stored in the security module, wherein the first public key is configured to expire after a predetermined period of time.

12. The method of claim 11, wherein the verifying the handshake process comprises:
   sending a client certificate to the key server;
   engaging in a key exchange with the key server;
   incorporating a client session key into a finished hash;
   sending a client finished message to the key server; and
   receiving and verifying a server finished message from the key server.

13. The method of claim 11, further comprising:
   receiving a key from the key server along with a time value;
   loading the key at a key cache;
   setting a countdown timer to the time value;
   decrementing the countdown timer; and
   if the countdown timer reaches zero or a next key is received from the key server with a next time value, rendering the key unusable.

14. The method of claim 13, wherein the countdown timer is implemented in a hardware register, and wherein decrementing the countdown timer comprises decrementing the hardware register.

15. The method of claim 13, wherein the received key and time value are received in a sequentially numbered message.

16. The method of claim 11, wherein the authenticated connection between the client and the key server is implemented using a protocol that complies with the Transport Layer Security (TLS) protocol.

17. The method of claim 11, wherein the first public key is configured to expire after a countdown timer reaches zero.

18. A client device in communication with a plurality of key servers, the client device comprising:
   a local host configured to:
      send a first public key, wherein the first public key corresponds to a first key server in the plurality of key servers, and wherein the first public key is configured to expire after a predetermined period of time, and
      send a secure configuration message; and
   a security module programmed with secure server authorization data corresponding to the key server, wherein the secure server authorization data comprises a hash value of the first public key, wherein the security module is configured to:
      determine that the first key server is authorized by comparing information stored in the security module with the hash value of the first public key,
      determine, based on accessing information in the security module, whether the first key server is permitted to authorize additional key servers,
      in response to determining that the first key server is permitted to authorize additional key servers, sign a second public key of a second key server with the first public key to authorize the second key server, wherein either the first public key or the second public key can be used to authorize an additional key server,
      determine whether the secure configuration message is accompanied by an authorized signature of an authenticated public key, and
      in response to determining that the secure configuration message is accompanied by the authorized signature, reconfigure the security module based on the secure configuration message.

19. The client device of claim 18, wherein the local host is further configured to attach a time value to the first public key prior to sending it to the security module, wherein the security module is further configured to set a countdown timer based on the time value, and wherein the first public key expires after the countdown timer reaches zero.

20. The client device of claim 18, wherein the first public key is configured to expire after a countdown timer reaches zero.

* * * * *